Rodney H. Moyle
Rex A. Moyle   INVENTORS 3,250,207
APPARATUS FOR FEED PREPARATION
Rodney H. Moyle and Rex A. Moyle, both of Rte. 1, Eagle, Idaho
Filed Oct. 8, 1964, Ser. No. 402,580
4 Claims. (Cl. 99—235)

This application is a continuation-in-part of the application of Moyle et al., Serial No. 175,872, filed February 21, 1962, now Patent No. 3,192,047, and entitled, "Method and Apparatus for Feed Preparation."

This invention relates to apparatus for the preparation of a proteinaceous feed for carnivorous animals. More particularly, this invention relates to apparatus for converting viscera, such as poultry viscera, into a high quality proteinaceous food for animals.

Animal viscera is known to contain high quantities of proteins and other nourishing materials which are potentially useful as food for carnivorous animals. Unfortunately, the viscera also contains a significant amount of feces. Frequently, and especially in the case of poultry viscera, the feces will contain medicinal degradation products that can be tolerated by poultry but are extremely harmful to animals. For example, poultry viscera will frequently contain zinc and mercury compounds initially ingested by the poultry for the control of coccideosis.

Because of the crimped muscular structure of the intestinal portions of the viscera, it is extremely difficult to obtain a complete separation of the feces from the other components of the intestines and the viscera. This is the case even though proteinaceous components of the viscera, such as the intestines, are water insoluble, whereas the feces is water soluble. Thus, even when the viscera is ground to a fine condition and agitated in the presence of copious quantities of water, it is still not possible to obtain complete solution of the feces in the water because of the entrapment of small portions thereof in convolutions and folds of the intestines even if they are ground and in a finely divided condition. As a consequence, animal viscera and poultry viscera in particular has found only limited utility as a food supplement because of the contaminating presence of feces. For example, a food for mink or other fur bearing rodents and pets will normally contain less than about 10% by weight of comminuted viscera because of the contaminating presence of feces therein.

Another object of the present invention is the provision of apparatus for comminuting viscera and for substantially completely washing the viscera clean of feces.

Still another object is inexpensive apparatus for the provision of a food for animals substantially free from feces and containing a high percentage of comminuted animal viscera.

The manner in which these and other objectives are obtained will be more clearly apparent from the accompanying drawing and the following description of a preferred embodiment of the present invention.

Figure 1:
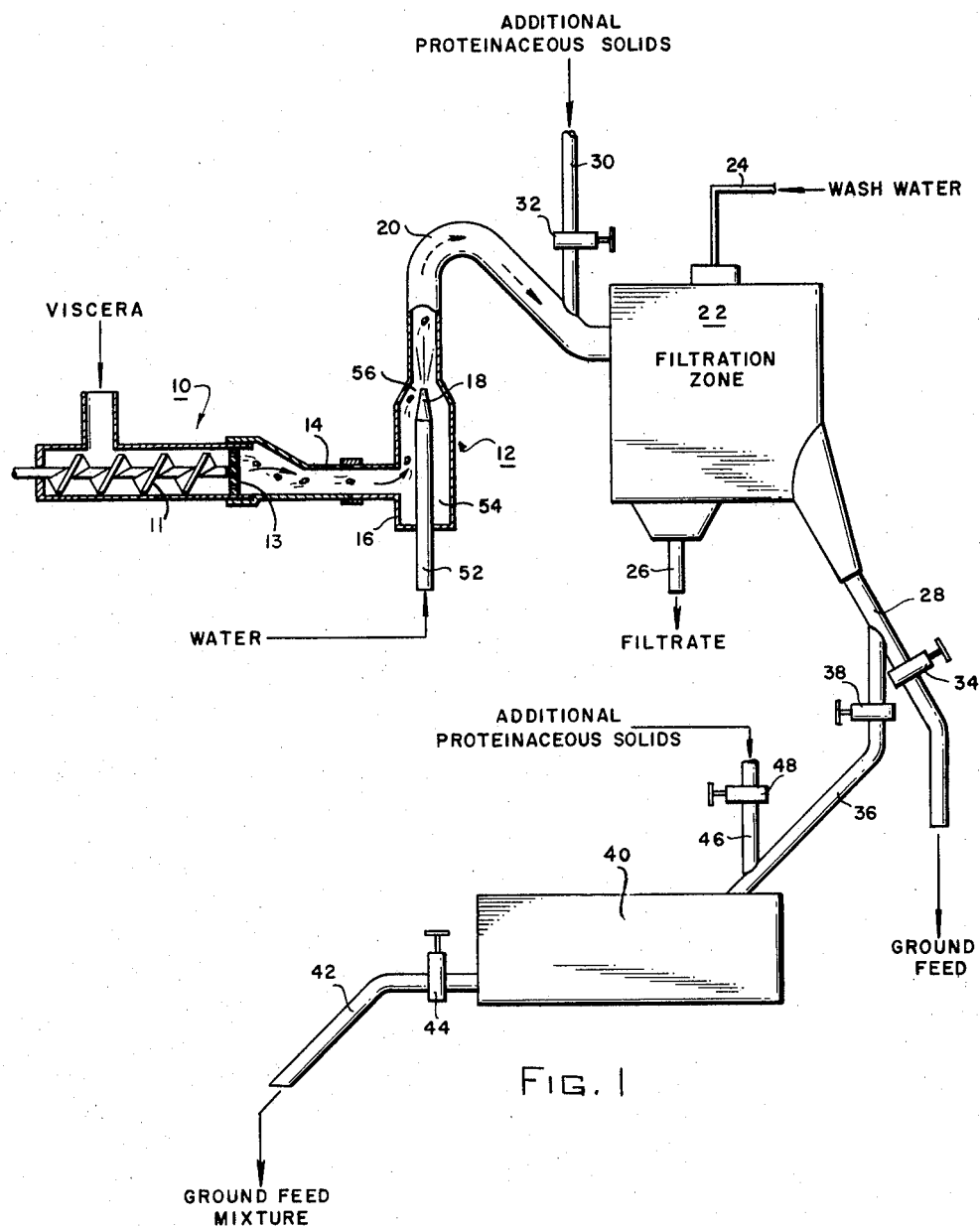
Figure 2:
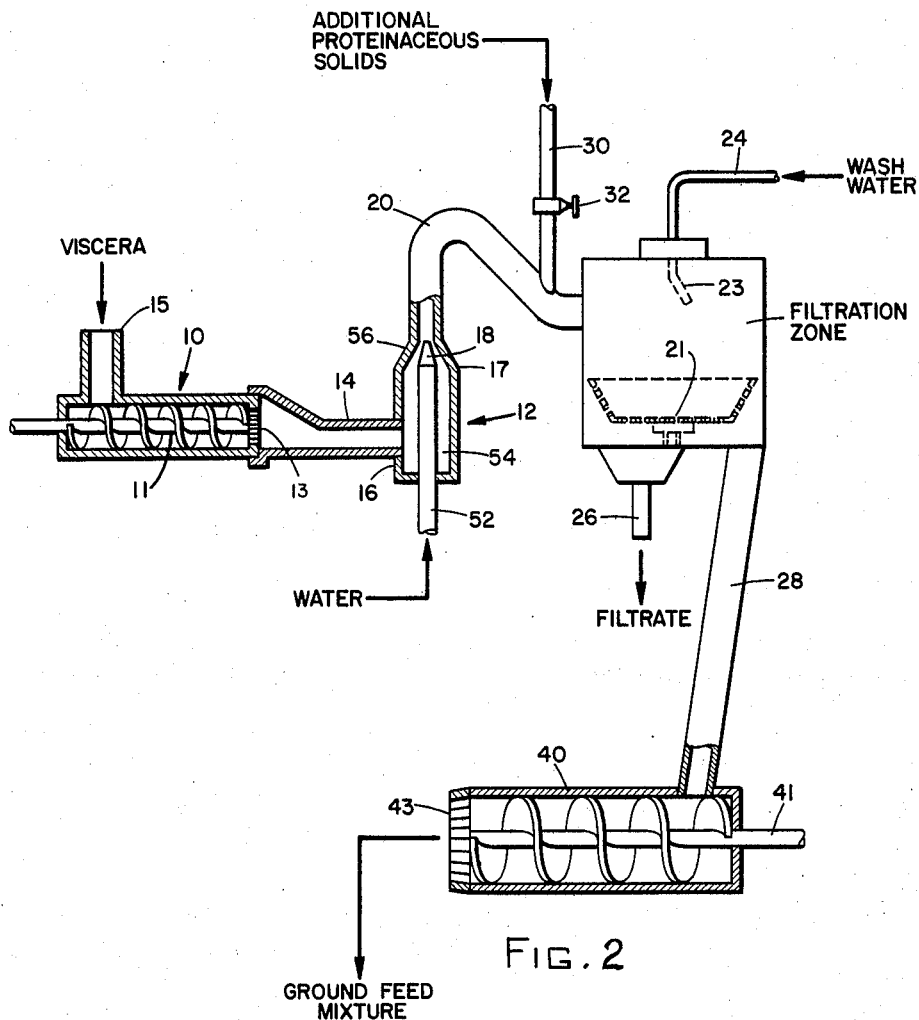

In the drawing, FIGURE 1 is a schematic flow sheet of a preferred embodiment of the present invention with the comminuted means and washing means shown in greater detail; FIGURE 2 is a schematic flow sheet of a simplified embodiment of the present invention with parts broken away.

Turning now to FIGURE 1, there is disclosed a viscera treating means comprising a comminuter, such as a grinder 10 comprising a screw 11 and a grinding plate 13. Viscera to be ground is delivered to grinder 10 by way of a chute 15 after being suitably transported to the grinder 10 from a cleaning table by a trough containing a flowing stream of water. Since any conventional device of this nature known to those skilled in the art may be used in the present invention, the grinder 10 and dressing table need not be described in greater detail.

In accordance with the present invention, there is provided venturi vacuum expansion means for opening up the folded and convoluted ground particles of viscera, including jet washing means designated generally by the numeral 12, connected by a conduit 14 with the discharge end of the grinder 10 which is upstream from a venturi jet 18.

Stated somewhat differently, in accordance with the present invention, a preferred venturi expansion means for opening up the viscera particles so they can be cleaned by further washing comprises a water delivery pipe 52 terminating in a nozzle or venturi jet 18. A casing 16, provided about the water delivery pipe 52, has a tapered portion 17 centered about the nozzle 18 of the water delivery pipe 52 whereby water delivered to the pipe 52 under pressure which is jetted from the nozzle 18 will create at least a partial vacuum in the annulus 54 between the pipe 52 and the casing 16. This vacuum causes the folded particles of intestine and other viscera to open up so that they can be washed clean internally. In accordance with the present invention ground viscera discharged from the grinder 10 is delivered to the annulus 54 by an appropriate means such as a conduit 14 interconnecting the discharge end of the grinder 14 with the annulus 54, upstream from the nozzle 18 and the pipe 52.

A discharge conduit 20 connected with the casing 16 leads from the venturi to a filtration zone 22, wherein comminuted and cleaned viscera is filtered and wherein a proteinaceous filter cake from the filter operation, is washed with fresh water in order to substantially completely remove feces from the viscera. The wash water is supplied to filtration zone 22 through line 24 and the feces-contaminated filtrate and wash water are discharged from the zone 22 by a discharge line 26. The cleaned, comminuted substantially feces-free viscera is discharged from zone 18 by way of a conduit or chute 28 leading to a suitable storage zone (not shown).

In accordance with one form of the present invention, a supplemental proteinaceous solid, such as poultry feet or poultry heads, or similar by-products from the slaughtering of animals or poultry, is charged to the filtration zone 22 by way of a conduit or chute 30 containing flow control means such as a valve or gate 32.

In accordance with another feature of our invention, the discharge conduit 28 from filtration zone 22 may be blocked (e.g., by a valve or gate 34) and the products from the line 28 are then conveyed by a branch conduit or chute 36 controlled by a valve or gate 38 which leads to a second grinding zone 40, which may be of a construction which is the same as, or different from, the construction of grinder 10. Any coarse or unground supplemental feed introduced through line 30, obviously, will be comminuted in the second grinding zone.

Within the zone 40 the cleaned viscera and supplemental proteinaceous material are reground to provide a homogenous mixture which is discharged from zone 40 by way of a conduit or chute 42 controlled by a valve or gate 44.

In accordance with a further modification of the present invention, all or a part of the supplementary proteinaceous material can be added directly to the zone 40 (e.g., by a conduit or chute 46 controlled by a valve or gate 48). It will be understood that supplementary proteinaceous solids may be fed simultaneously to zone 22 and zone 40 through conduits 30 and 46, respectively, when so desired.

Turning next to FIGURE 2, there is described a simplified embodiment of the invention shown in FIGURE 1. In FIGURE 2 the grinder 10 and jet washing means 12 are identical with the grinder 10 and jet washing means 12 of FIGURE 1, as is the conduit 20 and the chute 30. Therefore, they will not be described in greater detail.

In accordance with this embodiment of the present invention, the filtration zone 22 preferably comprises a circular screen member or foraminous basket 21 which is mounted is suitable bearings in zone 22 for continuous rotational movement. Wash water delivered to the filtration zone 22 by the pipe 24 is jetted onto the screen 21 by a jet means 23 which is angled in the direction of the discharge end of the filtration zone 22. As shown, the jet means 23 is preferably located in the upper portion of the filtration zone 22. It may consist of a single jet nozzle or a plurality, as desired. Any suitable means (not shown) such as a motor driven V-belt engaging a conventional V-groove pulley on the screen structure may be employed to rotate the screen 21.

With this screen structure and related mechanism, the slurry charged to the filtration zone by the line 20 (which will comprise a slurry of solid portions of the viscera in an aqueous solution of feces) will be initially drained of the initial aqueous solution of feces on entry into the filtration ozne 22. The remaining solids, as they are rotated about the zone 22 on the inner surface of the screen, are meanwhile being washed and physically moved to the right, as seen in FIGURE 2, i.e., in a down stream direction by the jet of wash water 23. As a consequence the solids discharged from the filtration zone 22 by way of conduit 28 will be substantially completely free from feces. The feces solution initially charged to filtration zone 22 and spent wash water are discharged in any conventional manner such as by means of a single discharge pipe 26.

Also, in accordance with this embodiment of the present invention, additional feces-free and slaughterhouse refuse such as poultry feet, necks, etc., are charged to filtration zone 22 through conduit 30 controlled by gate 32. Since this material will not have been ground, a second grinding operation is necessary. Moreover, it is desirable to intimately comingle the washed feces-free viscera particles with other slaughterhouse by-products which may be coarse or unground in order to provide for a more palatable and homogenous product. Therefore, the conduit 28 is suitably connected with a second grinder 40 which, as in the case of grinder 10, comprises a screw 41 and a dieplate 43 for grinding a discharging the mixture. It will be understood that the parts as shown in FIGURE 2 are not necessarily drawn to scale.

*Operation*

By way of example, crude poultry viscera such as chicken viscera obtained from poultry slaughtering operations may be conveyed in an appropriate manner (not shown) to the grinder 10. For example, the poultry viscera from a conveyor line may be placed in a trough (not shown) containing running water to provide a vehicle for conveying the viscera to grinder 10. Within the grinder 10, the viscera and water mixture is comminuted and forced through grinder head 13 as discrete solid particles which are desirably less than ½ inch and more preferably less than ¼ inch in length. At this point the comminuted viscera will contain its original content of feces and moreover, because of the crimped or folded nature of the intestines, much of the feces will be trapped in the folds of comminuted viscera.

At the same time, a stream of water from any suitable source (not shown) is charged by a line 52 to the venturi jet 18 for flow therethrough. The pressure normally encountered in civic water lines will be adequate for this purpose when the jet 18 has a discharge diameter of about ¼ inch or less. Higher pressure may be used, if desired. As a consequence, a substantial vacuum is induced in the throat or annulus 54 of the venturi means 12. Through the provision of a coupling means 14, such as a hose, between the discharge end of the grinder 10 and the throat section 56 of the venturi 12, a vacuum is formed which is normally sufficient not only to positively pull the comminuted particles into the throat section 56 but also to expand the comminuted particles of the viscera to substantially completely unfold crimps of the solid portions thereof (e.g., intestines) and hence, expose substantially all of the surface area.

The thus expanded or exfoliated comminuted viscera is induced into the jet of water emanating from the jet 18 of the venturi means 12. Because of the high velocity of water jet, the inducted viscera will be subjected to violent turbulent agitation which will act to further shred any shreddable components of the comminuted viscera and literally blast or otherwise remove the minute portions of feces from the uncrimped (exfoliated) comminuted viscera.

The resulting mixture, as indicated, is flowed from venturi means 12 through conduit 20 to a filtration zone 18, wherein water is removed from the proteinaceous solids and thereby there is obtained a filtrate 26 which will contain in solution substantially all of the feces initially present in the crude viscera. The filter-cake that is formed is preferably washed free of any occluded filtrate with additional water introduced by line 24. The wash water is preferably discarded through line 26 along with the filtrate. The filtration zone 22, FIGURE 1, may be of any conventional desired construction, comprising, for example, a pan filter, leaf filter, rotary filter, etc. Preferably, as a matter of convenience and for an additional reason to be disclosed, the filtration zone 22 is a rotary filter which may be of any desired construction. When a rotary filter is to be employed, and when it is desired to add additional proteinaceous material to the cleaned comminuted viscera, this may be conveniently accomplished by adding the meat scraps, chicken feet, chicken fat, chicken heads, meals, medicaments, etc., or mixtures thereof, to the filtration zone 22 through conduit 30 together with the slurry from the line 26 whereby the supplementary material will assist in filtration of the cleaned comminuted viscera. By rotating the filter at sufficient speed, centrifugal force will aid the water jet in moving the comminuted viscera particles down stream.

As indicated, the filtrate 26 is discharged from filtration zone 22 and is preferably sewered because of its feces content.

The comminuated solid portions of the viscera alone, or in combination with supplementary materials, is discharged from zone 22 by conduit 28 and may be utilized at this point if desired as a food for carnivorous animals.

In accordance with an alternate method of operation, the conduit 28 is blocked at 34 and the solid comminuted material together with added proteinaceous solids is routed by conduit 36 to the second grinding zone 40, in order to comminute the added proteinaceous material. As indicated, still further quantities of proteinaceous solid may be simultaneously or alternately charged to grinder 40 through conduit 46.

The operation in the embodiment of the invention shown in FIGURE 2 is substantially the same as shown in FIGURE 1 and will not be repeated in detail. While design of the screen or basket 21 is not critical, it is desirable to provide it with somewhat raised and outwardly sloping walls so that the particles of comminuted viscera will move out, due to the washing action from jet means 23, assisted by the centrifugal force of rotation of the screen to fall over the screen rim to discharge line 28. In general, it is preferable to supply an amount of water to the pipe 52 with reference to the amount of water and viscera charged to the grinder 10 such that the slurry entering into the conduit 20 will contain from about 5 to 20 weight percent of ground particles.

The amount of additional proteinaceous slaughterhouse by-products added by the conduit 30 will preferably be such that the final carnivore food composition discharged from the second grinder 40 will contain from about 25 to 50 weight percent of the total weight of the mixed product.

In any event, the final product discharged from zone 40 will constitute a comminuted substantially feces-free food for carnivores.

By means of the process and apparatus of the present invention, whereby substantially complete removal of the feces is achieved, it is possible to provide a carnivore feed containing substantially in excess of 10 percent by weight of comminuted poultry viscera.

In accordance with the present invention, a new food for carnivourous animals is provided, containing, for instance, from about 25 to 100 percent comminuted poultry viscera, the remainder being comminuted proteinaceous solids such as poultry heads, poultry feet, or other by-products of animal or poultry slaughtering operations.

A preferred composition of the present invention which is particularly satisfactory as a food for mink or other members of the weasel family or other fur bearing animals, such as dogs, foxes, etc., will comprise from about 25 to 50 percent by weight of comminuted poultry viscera, the balance comprising comminuted poultry heads and feet.

It is intended by the claims which follow to cover the various modifications described above, together with their equivalents and such variations as would suggest themselves to those skilled in the art.

What is claimed is:

1. Apparatus for preparing a substantially feces-free food for carnivorous animals, comprising viscera comminuting means, venturi means for applying a vacuum force to folded particles of viscera to cause them to open up, means for supplying water under pressure to said venturi means, and a conduit interconnecting said comminuting means with said venturi means, said conduit means being extended upstream from said venturi means.

2. In apparatus of the character described, the combination which comprises a comminuting device for viscera and the like containing objectionable matter, an exit conduit from said device, washing means in said conduit, and means within said conduit including a tapered nozzle and venturi throat means surrounding said nozzle for applying a sufficient vacuum force to said comminuted viscera particles within the conduit to open up said particles and thereby facilitate effective removal of said objectionable matter by said washing means.

3. Apparatus for preparing a proteinaceous food for carnivorous animals from viscera and the like containing objectionable matter which comprises, in combination, a grinder, a water delivery pipe terminating in a tapered nozzle and capable of supplying water under pressure through said nozzle, a casing about said pipe, said casing having a tapered portion substantially centered about said pipe and nozzle whereby said nozzle and tapered portion constitute a venturi capable of applying a substantial vacuum force to open up folded particles of viscera passing through the casing to facilitate internal cleaning thereof, a conduit connecting said grinder with said casing to permit passage of ground viscera from the grinder to the annular space between said casing and said nozzle.

4. A system for preparing ground food for carnivores from slaughterhouse products which include viscera containing feces comprising, in combination, a first grinder for the viscera, means for passing the ground viscera on to a conduit which conduit comprises a venturi means for applying a vacuum force for opening up the folded ground particles or vice versa jet means for washing feces from said opened particles of said viscera, a second grinding zone, and means for passing the ground viscera particles from the venturi and jet means to said second grinding zone for further grinding.

References Cited by the Examiner

UNITED STATES PATENTS

| | | | |
|---|---|---|---|
| 267,715 | 11/1882 | Pond | 241—39 |
| 522,590 | 7/1894 | Girvan | 241—39 |
| 601,521 | 3/1898 | Melcher | 37—62 |
| 991,178 | 5/1911 | Stock | 99—235 |
| 1,758,047 | 5/1930 | Jensen | 37—62 |
| 1,839,941 | 1/1932 | Zelezniak | 210—210 X |
| 2,044,088 | 6/1936 | Lord | 37—62 X |
| 2,096,594 | 10/1937 | Sanchez | 210—211 |
| 2,518,591 | 8/1950 | Aston | 37—62 X |
| 2,907,662 | 10/1959 | Covey | 146—182 X |

WALTER A. SCHEEL, *Primary Examiner.*

ROBERT E. PULFREY, *Examiner.*

CLYDE I. COUGHENOUR, *Assistant Examiner.*